(12) United States Patent
Moe

(10) Patent No.: US 10,392,678 B2
(45) Date of Patent: Aug. 27, 2019

(54) ENERGY EFFICIENT INTEGRATED PROCESS FOR PRODUCTION OF METALS OR ALLOYS

(71) Applicant: ELKEM AS, Oslo (NO)

(72) Inventor: Havard Ingvald Moe, Oslo (NO)

(73) Assignee: ELKEM ASA, Oslo (NO)

( * ) Notice: Subject to any disclaimer, the term of this patent is extended or adjusted under 35 U.S.C. 154(b) by 0 days.

(21) Appl. No.: 15/527,241

(22) PCT Filed: Dec. 8, 2015

(86) PCT No.: PCT/NO2015/050240
§ 371 (c)(1),
(2) Date: May 16, 2017

(87) PCT Pub. No.: WO2016/093704
PCT Pub. Date: Jun. 16, 2016

(65) Prior Publication Data
US 2017/0356064 A1    Dec. 14, 2017

(30) Foreign Application Priority Data

Dec. 9, 2014   (NO) .................................. 20141486

(51) Int. Cl.
*C22B 5/10* (2006.01)
*C22B 4/00* (2006.01)
(Continued)

(52) U.S. Cl.
CPC ............... *C22B 5/10* (2013.01); *C10B 53/02* (2013.01); *C10L 5/442* (2013.01); *C10L 5/447* (2013.01);
(Continued)

(58) Field of Classification Search
CPC .. C22B 4/00; C22B 5/10; C10B 53/02; C21B 2100/40; C10L 5/442; C10L 5/447
(Continued)

(56) References Cited

U.S. PATENT DOCUMENTS 1,430,971 A * 10/1922 Fornander ............. C21B 5/8002
                                                                  373/113
3,010,796 A * 11/1961 Zhang et al. ............ H05B 7/12
                                                                  373/82
(Continued)

FOREIGN PATENT DOCUMENTS

CN       1257131 A     6/2000
CN       101298642 A   11/2008
(Continued)

OTHER PUBLICATIONS

Wang, Chuan et al. Utilization of Biomass for Blast Furnace in Sweden—Report I: Biomass Availability and Upgrading Technologies. pp. 1-97. KTH Industrial Engineering and Management. Project No. 35819-1. (Year: 2013).*

(Continued)

*Primary Examiner* — Tima M. McGuthry-Banks
(74) *Attorney, Agent, or Firm* — Lucas & Mercanti, LLP

(57) ABSTRACT

A method for the energy efficient production of metals and alloys by carbothermic reduction of minerals and ores in electric reduction reactors is disclosed. The method includes conveying a wood containing material to at least one pyrolysis step for producing charcoal; conveying the produced charcoal, possibly other carbon-containing reduction materials and metal containing raw materials to the at least one reactor for producing metal or alloy; conveying off-gas from the at least one pyrolysis step and off-gas from the at least one reactor to at least one energy recovery step.

15 Claims, 5 Drawing Sheets

(51) Int. Cl.
  *C10L 5/44* (2006.01)
  *C10B 53/02* (2006.01)
  *C22B 4/08* (2006.01)

(52) U.S. Cl.
  CPC .................. *C22B 4/00* (2013.01); *C22B 4/08* (2013.01); *Y02E 50/14* (2013.01); *Y02P 10/122* (2015.11); *Y02P 10/132* (2015.11)

(58) Field of Classification Search
  USPC ........................ 75/10.59, 10.6, 10.61; 44/606
  See application file for complete search history.

(56) References Cited

U.S. PATENT DOCUMENTS

| | | | | |
|---|---|---|---|---|
| 4,145,193 | A * | 3/1979 | Hegemann | B01D 47/06 |
| | | | | 261/DIG. 54 |
| 4,389,493 | A * | 6/1983 | Lask | C01B 33/025 |
| | | | | 501/154 |
| 4,450,003 | A * | 5/1984 | Herold | C01B 33/025 |
| | | | | 266/144 |
| 4,981,668 | A | 1/1991 | Dosaj et al. | |
| 5,174,810 | A * | 12/1992 | Dosaj | C22C 33/003 |
| | | | | 75/10.5 |
| 2010/0319348 | A1* | 12/2010 | Jones | F22B 1/183 |
| | | | | 60/670 |
| 2011/0214425 | A1* | 9/2011 | Lang | C09C 1/48 |
| | | | | 60/643 |
| 2011/0236291 | A1 | 9/2011 | Lang et al. | |
| 2012/0031232 | A1 | 2/2012 | Huang et al. | |
| 2014/0109638 | A1* | 4/2014 | Aelion | C10G 1/002 |
| | | | | 71/24 |
| 2017/0130131 | A9* | 5/2017 | Mason | C10B 47/00 |

FOREIGN PATENT DOCUMENTS

| | | |
|---|---|---|
| CN | 101688258 A | 3/2010 |
| CN | 101790591 A | 7/2010 |
| CN | 101962557 A | 2/2011 |
| CN | 102209586 A | 10/2011 |
| EP | 2036855 A2 | 3/2009 |
| EP | 1264901 B1 | 7/2009 |
| JP | 2006282914 A | 10/2006 |
| KZ | 23501 A4 | 12/2010 |
| RU | 2302450 C2 | 3/2006 |
| SE | 393816 B | 5/1977 |
| WO | 2009126052 A1 | 10/2009 |
| WO | WO-2012164160 A * | 12/2012 |

OTHER PUBLICATIONS

I. J. Eikeland, et al; Reducing CO2 emissions in Norwegian ferroalloy production; Research Gate; 2001,26 pages.
International Search Report dated Aug. 3, 2016 for PCT/NO2015/050240.
Written Opinion dated Aug. 3, 2016 for PCT/NO2015/050240.
IPRP dated Aug. 3, 2016 for PCT/NO2015/050240.
Norwegian Search Reports for Patent Application No. 20141486 dated Jul. 3, 2015 and Mar. 30, 2017.
Office Action and Search Report dated Feb. 14, 2018 for corresponding Chinese Application No. 201580066738.0.
Russian Search Report dated Jun. 28, 2018 for Application No. 2017123940/02(041512).
English Translation of Chinese Supplementary Search Report dated Dec. 29, 2018 for corresponding Chinese Application No. 201580066738.0.
Li Peisheng et al. "Incineration and Pyrolysis of Solid Waste," China Environmental Science Press, Published Jul. 31, 2006, pp. 176-178.
Liu Qingyu "Effective Use of Energy," China Agriculture Press, Published Jun. 30, 2013, pp. 190-191.

* cited by examiner

ENERGY EFFICIENT INTEGRATED PROCESS FOR PRODUCTION OF METALS OR ALLOYS

CROSS REFERENCE TO RELATED APPLICATION

This Application is a 371 of PCT/NO2015/050240 filed on Dec. 8, 2015 which, in turn, claimed the priority of Norwegian Patent Application No. 20141486 filed on Dec. 9, 2014, both applications are incorporated herein by reference.

TECHNICAL FIELD

The present invention relates to an energy efficient method for the production of metals and alloys, and more particularly to an energy efficient method for the production of silicon and ferrosilicon.

BACKGROUND ART

A number of metals and alloys are produced by carbothermic reduction in electric smelting furnaces. Examples of such metals and alloys are silicon and ferrosilicon, ferromanganese, ferronickel, ferrochromium, ferrophosphorus, ferrovanadium and pig iron. These processes require high amounts of electric energy in order to reduce the ore to metals and alloys. In most countries the electricity consumed in the smelting furnaces is mainly produced by combustion of fossil carbon materials resulting in high $CO_2$ emissions.

The reduction materials used in the above processes are coal, coke, charcoal and wood chips. In the reduction process the main part of the carbon in these reduction materials will react with the metal oxides in the ore, but a smaller fraction reacts directly with ambient air. Both reactions emit $CO_2$. The use of fossil carbon materials like coke and coal which are the current predominant sources of reduction material results in a net increase in atmospheric $CO_2$ concentration. However, $CO_2$ released from bio-materials sources like charcoal and wood chips, may be considered carbon neutral if the emission is balanced by growth of new bio-materials that bind an equal share of $CO_2$. Population growth and global warming put pressure on the global society to increase resource efficiency and reduce $CO_2$ emissions.

Currently charcoal production is done by slow pyrolysis or carbonization in typically simplistic kilns or retorts of non-sophistic design. The pyrolysis facility is normally situated far from the plants for carbothermic production of metals and alloys. In addition charcoal production is not very energy efficient and has large emission of harmful particles and PAH (polycyclic aromatic hydrocarbon)-containing gases due to partial or incomplete combustion. Additionally the wide distribution of small charcoal production sites does not make it economically viable to clean off-gases from the charcoal kilns.

It is known to recover energy from off gases from electric smelting furnaces for metals and alloys. The amount of energy that can be recovered by current energy recovery systems is however limited. For instance for a conventional carbothermic silicon furnace the amount of electric energy that can be recovered in an energy recovery system will be in the range of 10-35% of the electric energy supplied to the furnace.

It is therefore a need to improve the energy efficiency of the carbothermic reduction processes for the production of metal and alloys and at the same time reduce $CO_2$ emissions from fossil carbon reduction materials.

SHORT DESCRIPTION OF THE INVENTION

By the present invention it has been found that by combining charcoal production with the reactor for carbothermic reduction of metals and alloys, using the charcoal as at least a significant part of the reduction material supplied to the carbothermic reactor, and conveying the off-gases from the charcoal pyrolysis and the off-gases from the carbothermic reduction reactor to an energy recovery step, it is possible to recover energy in the form of steam, hot liquid or electric energy in an amount that is substantially higher than what is obtained by conventional carbothermic reactor energy recovery systems. For instance when using only charcoal as reduction material in combination with closed carbothermic reactor for silicon production, it is possible to recover more energy than the electric energy supplied to the carbothermic reactor.

In addition, $CO_2$ emissions from fossil carbon reduction materials will be reduced directly proportional to the fraction of charcoal used in the carbothermic reactor.

The present invention thus provides a method for energy efficient production of metals and alloys by carbothermic reduction of minerals and ores in electric reduction reactors, said method comprising at least the following steps:

conveying a wood containing material to at least one pyrolysis step for producing charcoal;
conveying said produced charcoal, possible other carbon-containing reduction materials and metal containing raw materials to the at least one electric reduction reactor for producing metal or alloy;
conveying off-gas from said at least one pyrolysis step and off-gas from said at least one reactor to at least one energy recovery step.

According to one embodiment of the invention the energy recovery step comprises at least a combustion chamber and a heat exchanger. The heat exchanger generates steam or heats a liquid heating medium. In this embodiment the energy produced in the energy recovering step will be steam or hot liquid that can be used directly as a heating medium.

According to a second embodiment of the invention the energy recovery step in addition comprises a steam turbine and an electric generator wherein the steam produced in heat exchanger is supplied to the steam turbine and the electric generator. The electric energy produced in the electric generator is used to supply at least part of the electric energy to the electric reduction reactor or to deliver the produced electric energy to the grid.

According to a third embodiment of the invention the energy recovery step comprises a combined cycle gas turbine power generation system consisting of two electric energy producing steps, a gas turbine/electrical generator step and a steam turbine/electrical generator step. The electric energy produced in the electric generator is used to supply all or at least a substantial part of the electric energy to the electric reduction reactor or to deliver the produced electric energy to the grid.

The electric reduction reactor can be a conventional electric reduction furnace equipped with carbon electrodes for supply of electric current in order to provide sufficient heat energy to the reactor.

The electric reduction reactor can be an open reactor where the off-gases from the reactor are reacted with ambient air. The CO content in the reactor off gases will thus be reacted to $CO_2$.

Alternatively, the electric reduction reactor can be a closed or sealed reactor and in this case CO in the off-gases from the reactor will be combusted in the combustion chamber or used as fuel in the gas turbine in the energy recovery step. The energy recovery will thus be higher when using a closed carbothermic reactor than when using an open carbothermic reactor. With a closed reduction reactor the whole system can be operated at a pressure higher than atmospheric pressure thereby preventing any oxygen to leak into the system. This will further increase the energy recovery. A closed reactor will also reduce the cost of $CO_2$ capture from the energy recovery off-gases.

The heat energy recovered by the method of the present invention can either be used directly to provide heat energy in the form of steam or hot liquid, such as hot water, for industrial or for community heating purposes. Alternatively, the heat energy recovered by the method of the present invention can be converted to electric energy to be recycled to the electric reduction reactor or be delivered to the grid.

Compared to traditional charcoal production in simplistic kilns or retorts of non-sophistic design, the invention will have reduced emissions of harmful particles and PAH due to more complete combustion of the off-gases from the pyrolysis.

These and other features, advantages and benefits and objects will become apparent to one of ordinary skill in the art upon careful consideration of the detailed description of representative embodiments of the invention below and the accompanying drawings, in which similar elements are indicated in the various drawings using the same reference numbers.

BRIEF DESCRIPTION OF THE DRAWINGS

Embodiments of the invention will now be described with reference to the following drawings, wherein.

DETAILED DESCRIPTION OF THE INVENTION

As indicated above, the present invention may be used for the carbothermic production of any suitable metal or alloy.

For the sake of simplicity, the invention will be illustrated below with emphasize on the production of silicon and silicon alloy as an example.

Figure 1:
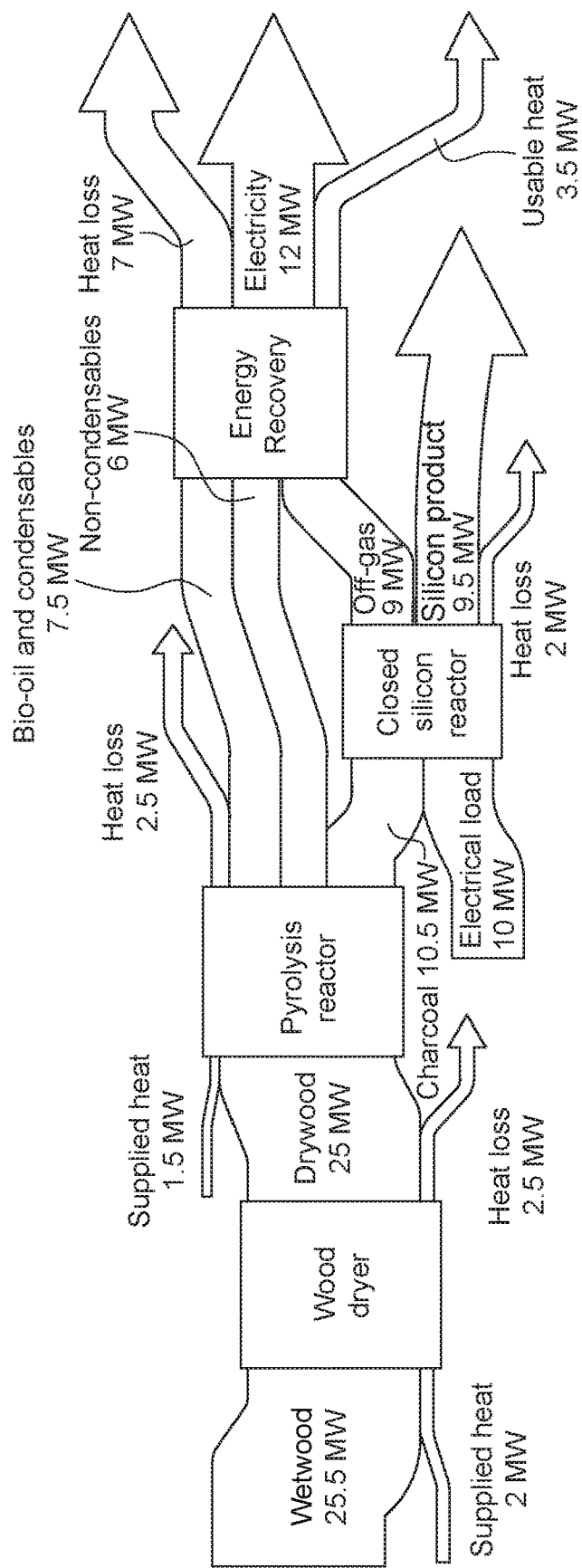
FIG. 1 illustrates the fundamental principles of the present invention.

FIG. 1 illustrates the fundamental principles of the invention by a Sankey diagram. The arrows in the Sankey diagram represent the energy flow in the system, from dry wood to electric energy.

Dry wood is supplied into the pyrolysis reactor for conversion to charcoal, bio-oil and pyrolysis gas. The charcoal is supplied to a closed silicon reactor. In addition quartz and electric energy is supplied to the silicon reactor. In the silicon reactor the quartz is reduced to molten silicon by the charcoal, and the produced silicon is tapped from the silicon reactor. The off-gases from the silicon reactor are combined with the off-gases from the pyrolysis process. In addition, condensable products from the pyrolysis process, including bio-oil, may be combusted to increase the energy recovery. The energy in the combined flow of off-gas and volatiles is recovered and it can be used for steam, hot liquid or electric energy production.

Compared to conventional carbothermic reactor energy recovery systems the amount and value of the recovered energy are substantially higher, due to:

Utilization of the total amount of energy available in the gas and liquid components in the total value chain from wood to metal or alloys, with more than 100% increase in the total amount compared to conventional energy recovery systems.

Potentially higher value of the produced steam and or heating medium, due to the possibility to provide steam and or heating medium at higher temperatures and pressures.

In the case of electric energy production, net efficiency of more than 50% can be obtained compared with conventional energy recovery systems that have efficiencies less than 30%.

Figure 2:
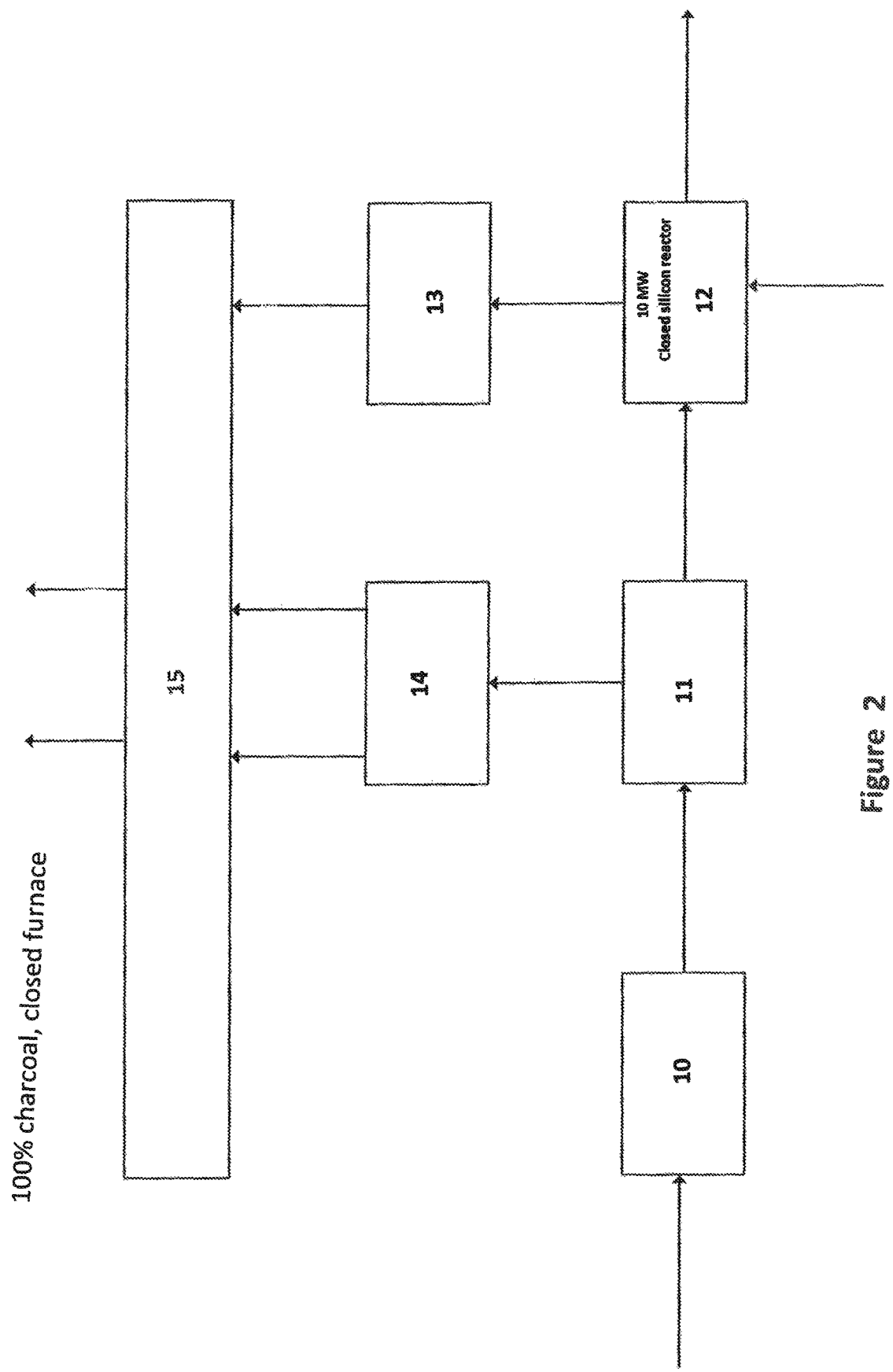
FIG. 2 illustrates a first embodiment of the method according to the present invention.

FIG. 2 illustrates one embodiment of the invention with a closed electric silicon reactor. Wet wood is supplied to a wood treatment reactor 10. In the wood treatment reactor 10 the wood is dried and subsequently supplied to a pyrolysis reactor 11 for production of charcoal. In the pyrolysis reactor 11 the dry wood is converted to charcoal, bio-oil and pyrolysis gas. The charcoal is supplied to the closed silicon reactor 12. In addition quartz and electrical energy are supplied to the silicon reactor 12. In the silicon reactor 12 there will further be carbon consumption from the carbon electrodes. In the silicon reactor 12 the quartz is reduced to molten silicon by the charcoal. The produced molten silicon is tapped from silicon reactor 12. The off-gas from the silicon reactor 12 is supplied to a first gas processing reactor 13 where solid particles mainly consisting of silica particles, are removed from the off-gas. The gas leaving the first gas processing reactor is supplied to an energy recovery plant 15. The pyrolysis gas leaving the pyrolysis reactor 11 is forwarded to a second gas processing reactor 14 where the pyrolysis gas is separated into bio-oil and synthesis gas.

The gas from the first gas-processing reactor 13 and the synthesis gas from the second gas-processing reactor 14 are sent to a gas turbine and generator system in the energy recovery plant 15 where the gas is combusted to produce electric energy. Heat-carrying exhaust gas from the gas turbine is sent to a combustion chamber where the heat content in the gas stream is boosted by injection and combustion of bio-oil from the second gas-processing reactor 14. The heat-carrying gas leaving the gas combustion chamber is supplied to a heat exchanger for production of steam. The steam may be supplied to a steam turbine and an electric generator for producing electric energy. Part of the steam or the hot liquid produced in the energy recovery plant 15 may be used in the wood treatment reactor 10 and in the pyrolysis reactor 11.

Figure 3:
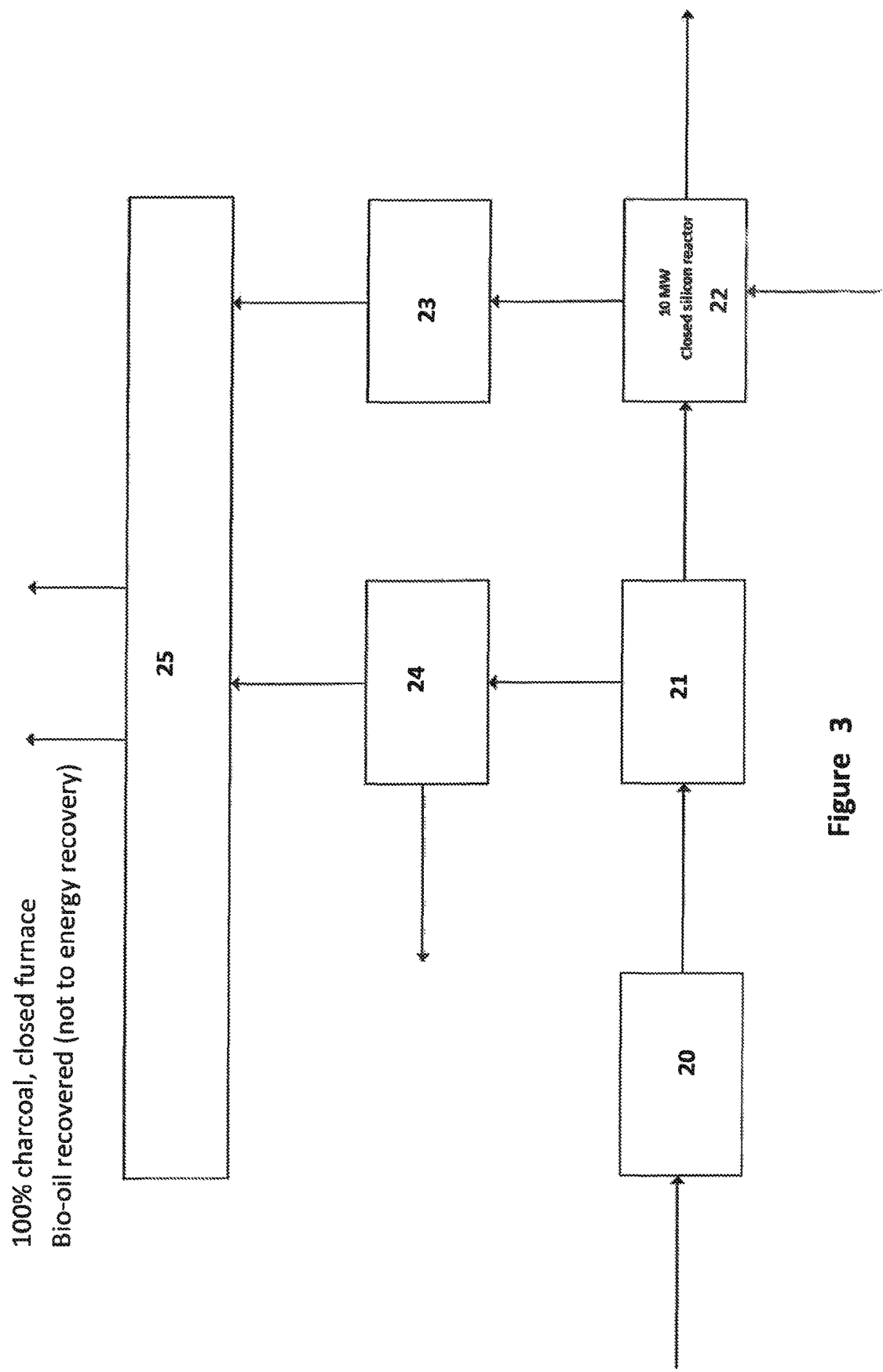
FIG. 3 illustrates a second embodiment of the method according to the present invention.

FIG. 3 illustrates another embodiment of the invention with a closed silicon reactor. 100% of the reduction material to the closed silicon reactor 22 is charcoal supplied from the pyrolysis reactor 21. The raw material supplied to the silicon reactor 22 in addition to charcoal, is quartz. The difference between the process according to the embodiment shown in FIG. 2 and the embodiment shown in FIG. 3 is that the bio-oil produced in the gas processing unit 24 is recovered and refined and sold as high value products. As the bio-oil is recovered and not supplied to the combustion camber to boast the heat from the off-gases, the energy recovery will be lower than in the embodiment shown in FIG. 2. The gas from the gas processing unit 24 and the gas from the first gas processing reactor 23 are forwarded to a combined cycle gas turbine power generation system in the energy recovery plant where the gases are used as fuel to the gas turbine/electrical generator step and the exhaust gas from the gas turbine is supplied to a heat exchanger to produce steam or hot liquid. The steam may be supplied to a steam turbine and an electric generator for producing electric energy.

Figure 4:
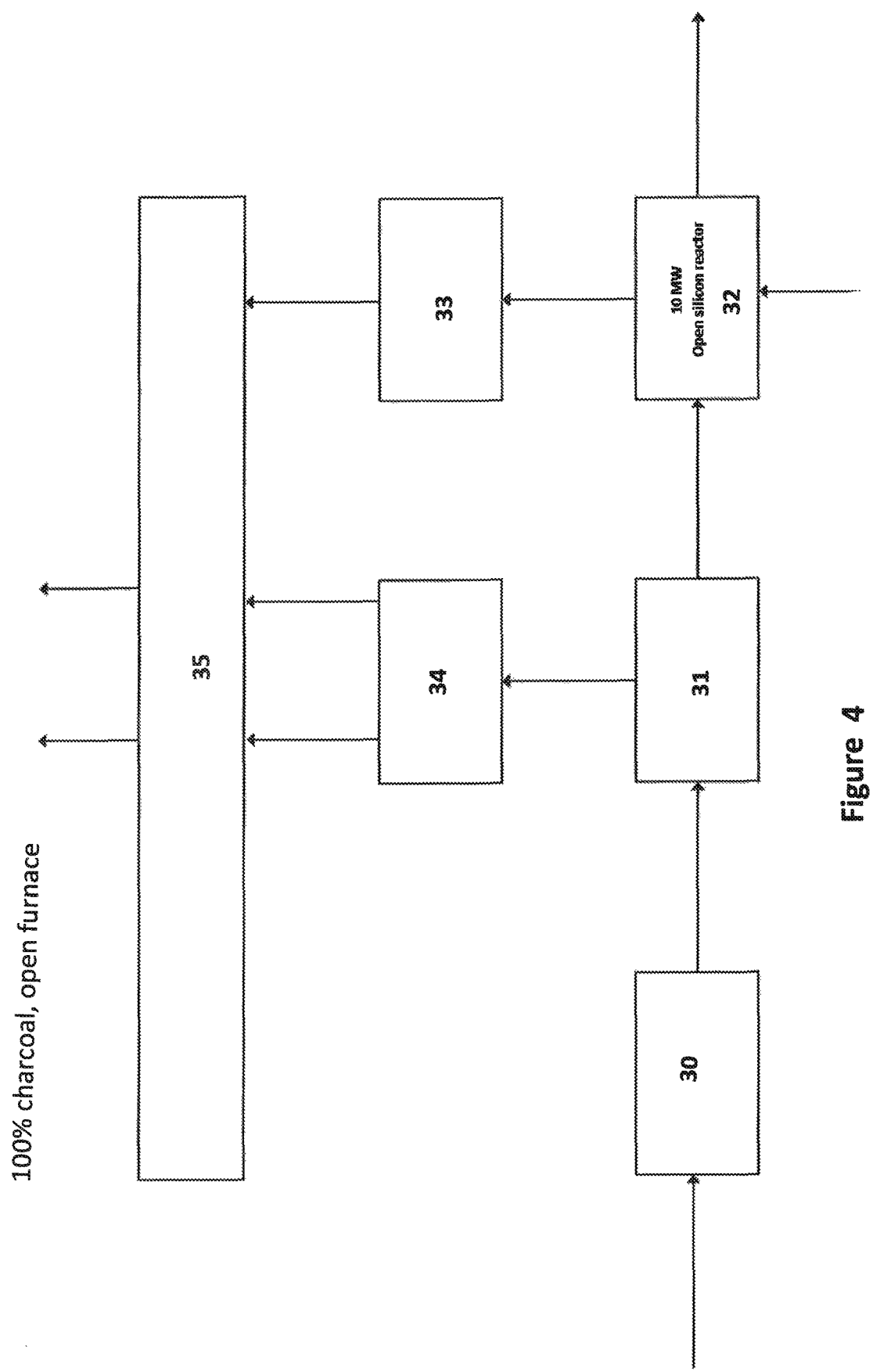
FIG. 4 illustrates a third embodiment of the method according to the present invention.

FIG. 4 illustrates an embodiment of the invention with an open silicon reactor. 100% of the reduction material to the open silicon reactor 32 is charcoal supplied from a pyrolysis reactor 31. The raw material supplied to the silicon reactor 32 in addition to charcoal is quartz. Wet wood is supplied to a wood treatment reactor 30. In the reactor 30 the wood is dried. From the reactor 30, dry wood is supplied to a pyrolysis reactor 31 for the production of charcoal. The charcoal is supplied to the open silicon reactor 32. In addition quartz and electrical energy is supplied to the silicon reactor 32. In the silicon reactor 32, the quartz is reduced to silicon by the charcoal. The off-gas from the silicon reactor 32 is supplied to a first gas processing reactor 33. Silica particles may be filtered and removed in this step, or later after the gas has passed the heat exchanger in the energy recovery plant 35. The pyrolysis gas leaving the pyrolysis reactor 31 is forwarded to a second gas processing reactor 34 where the pyrolysis gas is separated into bio-oil and synthesis gas. The gas from the first gas processing reactor 33 and the synthesis gas and bio-oil from the second gas processing reactor 34 are forwarded to gas combustion chambers in the energy recovery plant 35 where the gases are combusted and supplied to a heat exchanger to produce steam. The steam is supplied to a steam turbine and an electric generator for producing electric energy. Part of the usable heat produced in the energy recovery plant 35 may be used in the wood treatment reactor 30 and in the pyrolysis reactor 31.

Figure 5:
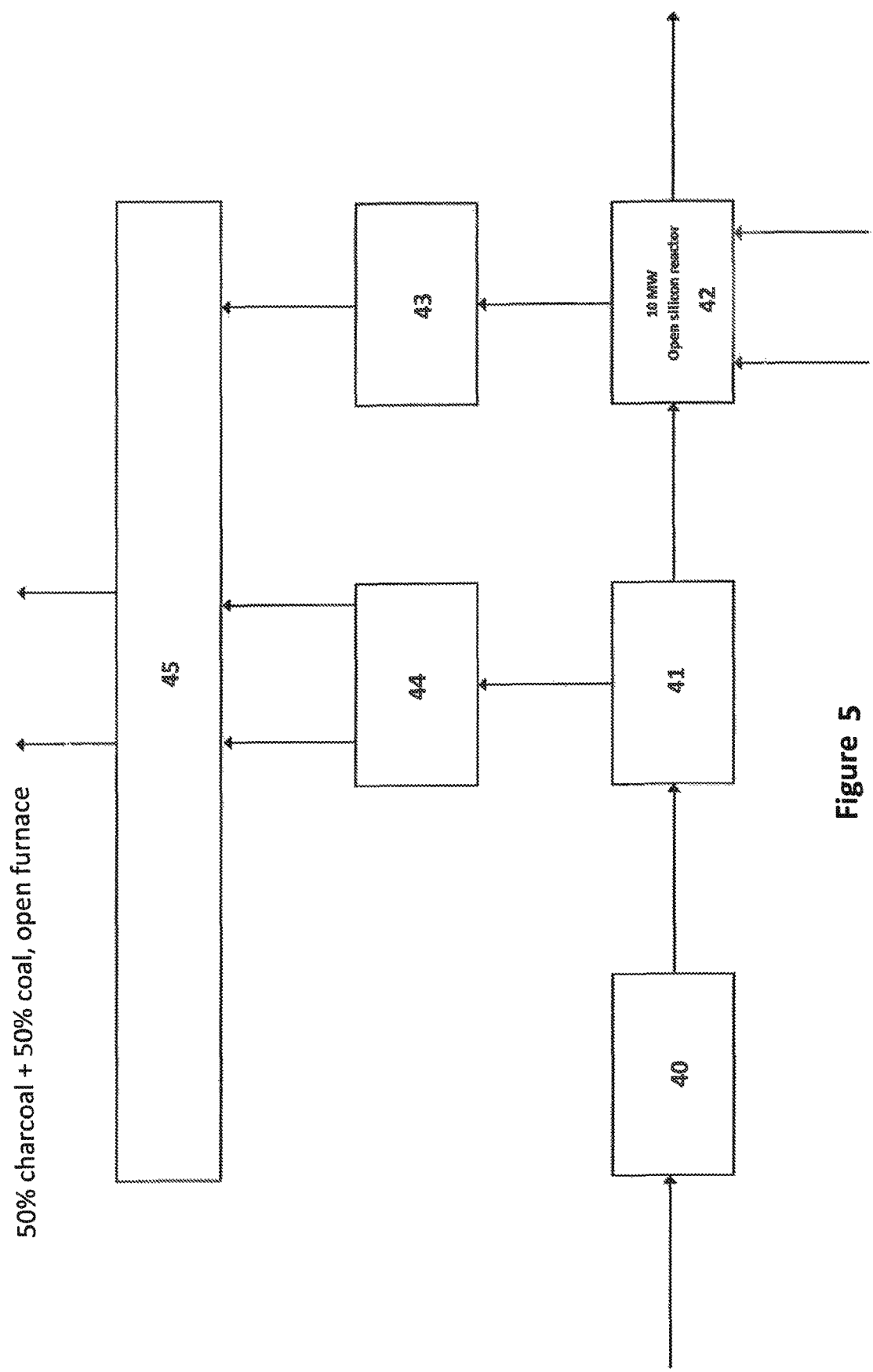
FIG. 5 illustrates a fourth embodiment of the method according to the present invention.

FIG. 5 illustrates another embodiment of the invention with an open silicon reactor. 50% of the reduction material to the silicon reactor 42 is charcoal and 50% of the reduction material is coal. The raw material supplied to the open silicon reactor 42 in addition to charcoal and coal, is quartz. Wet wood is supplied to a wood treatment reactor 40. In the reactor 40 the wood is dried using usable heat from an energy recovery plant 45. From the reactor 40, dry wood is supplied to a pyrolysis reactor 41 for the production of charcoal. In the pyrolysis reactor 41 the dry wood is converted to charcoal and pyrolysis gas. The charcoal is supplied to the open silicon reactor 42. In addition coal is supplied to this reactor 42. Also quartz and electrical energy is supplied to the silicon reactor 42. In the silicon reactor 42 the quartz is reduced to silicon by the charcoal and the coal. The off-gas from the silicon reactor is supplied to a first gas processing reactor 43. Silica particles may be filtered and removed in this step, or later after the gas has passed the heat exchanger in the energy recovery plant 45. The pyrolysis gas leaving the pyrolysis reactor 41 is forwarded to a second gas processing reactor 44 where the pyrolysis gas is separated into bio-oil and synthesis gas. The gas from the first gas processing reactor 43 and the synthesis gas and bio-oil from the second gas processing reactor 44 are forwarded to gas combustion chambers in the energy recovery plant 45 where the gases are combusted in a combustion chamber and supplied to a heat exchanger to produce steam or hot liquid. The steam may be supplied to a steam turbine and an electric generator for producing electric energy. Part of the usable heat produced in the energy recovery plant may be used in the wood treatment reactor 40 and in the pyrolysis reactor 41.

In one embodiment of the invention wood material, preferably in the form of wood chips, are dried and supplied to a pyrolysis reactor wherein the wood material is reacted into charcoal which is passed into a silicon/silicon alloy reactor containing reactants in the form of quartz, alloys, etc. In this reactor the charcoal serves as a reductant in the carbothermic reaction of the raw materials and silicon or silicon alloy is produced. The off-gas/silica from the silicon/silicon alloy reactor are passed into a off-gas processing unit wherein silica is separated and the gaseous components are passed into an energy recovery unit together with the pyrolysis gas and bio-oil from the pyrolysis reactor for the production of steam, hot liquid or electric energy. The energy recovery unit comprises at least a combustion chamber and a heat exchanger for the production of steam or hot liquid.

In an alternative embodiment of the invention the pyrolysis gas and the bio-oil from the pyrolysis reactor are passed to a gas/oil processing unit wherein syngas and bio-oil are separated. The bio-oil is optionally refined into different products or separately routed to the energy recovery unit for combustion. The syngas enters the energy recovery unit for the production of electric power and/or distributed heat. The off-gas and silica from the silicon/silicon alloy reactor are passed to an off-gas processing unit wherein silica is separated and the gaseous components are passed to the energy recovery unit for the production of electric power and/or distributed heat.

According to another embodiment of the present invention the electric energy produced in the energy recovery unit is used to supply at least part of the electric current to the electric reduction reactor.

According to another embodiment of the present invention part of the produced energy in the energy recovery unit is used as a heating source in the wood pyrolysis reactor.

According to another embodiment of the present invention the silicon/silicon alloy reactor is an open reactor.

According to a further embodiment of the invention the silicon/silicon alloy reactor is a closed reactor.

A closed reactor will have environmental advantages. One advantage with a closed reactor is that CO gas present in the off-gas can be combusted in the energy recovering step. In an open reactor only sensible heat can be recovered.

The present invention may be used for the production of different metals or alloys. Examples of such metals and alloys are silicon and ferrosilicon, ferromanganese, ferronickel, ferrochromium, ferrophosphorus, ferrovanadium and pig iron. According to the present invention the method is preferably used for the production of silicon and ferrosilicon.

With the present invention it is possible to obtain an energy efficient process by recovering energy and vastly reducing the $CO_2$ emissions from fossil carbon materials and also makes it possible to capture the $CO_2$.

By the present invention emissions of harmful particles and PAH from the charcoal pyrolysis will be significantly reduced compared to traditional charcoal production in simplistic kilns or retorts of non-sophistic design.

EXAMPLES

The following examples describe the present invention for production of silicon in an electric 10 MW continuously operated reactor with 3 dived pre-baked carbon electrodes.

In all examples at least a major part of the reduction material is charcoal supplied from a pyrolysis reactor situated at the same site as the silicon reactor.

Example 1

In this example 100% of the reduction material to the silicon reactor is charcoal supplied from the pyrolysis reactor. The silicon reactor is closed and operated at a Si yield of 95%. The raw material supplied to the silicon reactor in addition to charcoal is quartz. In the below description of example 1, reference is made to FIG. 2.

Wet wood, such as Norwegian spruce, are supplied to a wood treatment reactor 10 at a feeding rate of 9.7 tons/h. The supplied wet wood has a total energy content of 27.9 MWh/h. In the wood treatment reactor 10 the wood is dried using an available heat source from an energy recovery plant described later. From the drying reactor 10, 5 tons/h of dry wood is supplied to a pyrolysis reactor 11 for production of charcoal. The total energy in the dry wood is 28.1 MWh/h.

In the pyrolysis reactor 11 the dry wood is converted to charcoal, bio-oil and pyrolysis gas. 1.3 tons of charcoal having a total energy content of 10.4 MWh/h is produced in the pyrolysis rector 11 together with 3.8 tons/h of pyrolysis gas and bio-oil. The charcoal is supplied to the closed silicon reactor 12. In addition quartz and 10.0 MWh/h electrical energy is supplied to the silicon reactor 12. In the silicon reactor 12 there will further be a consumption of 80 kg/h of carbon from the carbon electrodes, which provides an additional 0.7 MWh/h to the process.

In the silicon reactor 12 the quartz is reduced to silicon by the charcoal. The silicon yield in the reactor 12 is 95%, meaning that 95% of the quartz is converted to silicon. From the furnace it is tapped 1 ton/h of liquid silicon having a total energy content of 10 MWh/h and an off-gas consisting mainly of CO-gas and silica particles. The reactor off-gas is about 2.6 tons/h and has a total energy content of 10 MWh/h.

The off-gas from the silicon reactor 12 is supplied to a first gas processing reactor 13 where solid particles mainly consisting of silica particles, are removed from the off-gas. The gas leaving the first gas processing reactor 13 is 2.5 tons/h and has a total energy content of 9.2 MWh/h. This gas is supplied to an energy recovery plant 15 that will be described later.

The pyrolysis gas leaving the pyrolysis reactor 11 is forwarded to a second gas processing reactor 14 where the pyrolysis gas is separated into bio-oil and synthesis gas. The output from the second gas processing reactor 14 is 2.1 tons/h of synthesis gas having a total energy content of 7.2 MWh/h and 1.8 tons/h of bio-oil having a total energy content of 8.6 MWh/h.

The gas from the first gas processing reactor 13, and the synthesis gas and bio-oil from the second gas processing reactor 14 are forwarded to the energy recovery plant comprising a combined cycle gas turbine power generation system. The gas from the first gas processing reactor 13 and the synthesis gas from the second gas processing reactor 14 are used as fuel for the gas turbine/electrical generator step in the in the energy recovery plant 15. The exhaust gas from the gas turbine and bio-oil from the second gas processing reactor 14 are forwarded to gas combustion chambers in the energy recovery plant 15 where the gases are combusted and supplied to a heat exchanger for producing steam. The steam is forwarded to a steam turbine and an electric generator for producing electric energy. In the energy recovering plant 15 it is produced 11.5 MWh/h electricity and 3.6 MWh/h of usable heat. More than 100% of the electric energy supplied to the silicon reactor is thus recovered. Part of the usable heat is used in the wood treatment reactor 10 and in the pyrolysis reactor 11.

This example shows that it by the present invention when using 100% charcoal and closed silicon reactor more electricity can be recovered than the electricity supplied to the silicon reactor. In addition there will be practically no emissions of $CO_2$ from fossil fuels, except for a very minor amount from consumption of carbon electrodes in the silicon reactor 12. The process of the present invention is thus energy neutral when using 100% charcoal and closed silicon reactor.

Example 2

In this example 100% of the reduction material to the silicon reactor is charcoal supplied from the pyrolysis reactor. The silicon reactor is closed and operated at a Si yield of 95%. The raw material supplied to the silicon reactor in addition to charcoal is quartz. In the below description of example 2, reference is made to FIG. 3.

The difference between the process according to this example and example 1 is that the bio-oil produced in the gas processing unit 24 is recovered and refined and sold as valuable products. 1.7 tons/h of bio-oil having an energy content of 8.2 MWh/h is passed to the refining stage. All the other process streams are present in the same amounts and with the same energy content as in example 1.

The synthesis gas output from the gas processing unit 24 is 2.1 tons/h having a total energy content of 7.2 MWh/h. The synthesis gas from the gas processing unit 24 and the gas from the first gas processing reactor 23 are forwarded to a combined cycle gas turbine power generation system in the energy recovery plant 25 where the gas energy is converted to electricity in a two-step process. In the energy recovery plant 25 8.5 MWh/h electricity and 2.7 MWh/h of usable heat are produced.

The example shows that when using 100% charcoal and a closed silicon reactor, and by recovering the bio-oil for refining, still 87% of the electricity supplied to the silicon reactor can be recovered. In addition, there will be practically no emissions of $CO_2$ from fossil fuels, except for a minor amount from consumption of carbon electrodes in the silicon reactor. The process carried out according to this example is therefore very energy efficient.

Example 3

In this example 100% of the reduction material to a silicon reactor is charcoal supplied from a pyrolysis reactor. The silicon reactor is open and operated at a Si yield of 87%.

The raw material supplied to the silicon reactor in addition of charcoal is quartz. In the below description of example 3, reference is made to FIG. 4.

Wet wood, such as Norwegian spruce, are supplied to a wood treatment reactor 30 at a feeding rate of 9.4 tons/h. The supplied wet wood has a total energy content of 27.1 MWh/h. In the reactor 30 the wood is dried using usable heat from an energy recovery plant, which will be described later. From the reactor 30, 4.9 tons/h of dry wood is supplied to a pyrolysis reactor 31 for the production of charcoal. The total energy of the dry wood is 27.3 MWh/h. In the pyrolysis reactor 31 the dry wood is converted to charcoal and pyrolysis gas. 1.3 tons/h of charcoal having a total energy content of 10.1 MWh/h is produced in the reactor 31 together with 3.6 tons/h of pyrolysis gas. The charcoal is supplied to the closed silicon reactor 32. In addition quartz and 10.8 MWh/h electrical energy is supplied to the silicon reactor 32. In the furnace there will further be a consumption of 86 kg/h of the carbon electrodes that provides an additional 0.8 MWh/h to the process.

In the silicon reactor 32 the quartz is reduced to silicon by the charcoal. The silicon yield in the reactor 32 is 87%, meaning that 87% of the silicon in the quartz is converted to silicon. From the silicon reactor 32 0.9 tons/h of liquid silicon having a total energy content of 8.9 MWh/h is tapped. As the silicon reactor 32 is open, off gases from the silicon reactor 32 will be combusted by ambient air and the CO content in the off gas will be combusted to $CO_2$. The off-gas consists of gaseous components including $CO_2$ and silica particles. The reactor off-gas is about 81 tons/h and has a total energy content of 10.7 MWh/h.

The off-gas from the silicon reactor 32 is supplied to a first gas processing reactor 33 where solid particles consisting mainly of silica particles are removed from the off-gas. The gas leaving the first gas processing reactor 33 is 80.8 tons/h and has a total energy content of 10.6 MWh/h. This gas is supplied to an energy recovery plant 35 which will be described later.

The pyrolysis gas leaving the pyrolysis reactor 31 is forwarded to a second gas processing reactor 34 where the pyrolysis gas is separated into bio-oil and synthesis gas. The output from the second gas processing reactor 34 is 2.0 tons/h of synthesis gas having a total energy content of 7.0 MWh/h and 1.6 tons/h of bio-oil having a total energy content of 8.0 MWh/h.

The gas from the first gas processing reactor 33 and the synthesis gas and bio-oil from the second gas processing reactor 34 are forwarded to gas combustion chambers in the energy recovery plant 35 where both gases and bio-oil are combusted and supplied to a heat exchanger to produce steam. The steam is supplied to a steam turbine and an electric generator for producing electricity. In the energy recovery plant 35, 7.4 MWh/h electric energy and 5.1 MWh/h of usable heat are produced. Part of the usable heat is used in the wood treatment reactor 30 and in the pyrolysis reactor 31. Silica particles is filtered and separated from the off-gas stream from the heat exchanger.

This example shows that by using 100% charcoal and an open silicon reactor 74% of the electric energy supplied to the silicon reactor 32 can be recovered. Thus, even when using an open reactor the present invention provides a very energy efficient process.

Example 4

In this example 50% of the reduction material to the silicon reactor is charcoal and 50% of the reduction material is coal. The reactor is open and operated at a Si yield of 86%.

The raw material supplied to the silicon reactor in addition to charcoal and coal is quartz. In the below description of example 4, reference is made to FIG. 5.

Wet wood, such as Norwegian spruce, are supplied to a wood treatment reactor 40 at a feeding rate of 4.7 tons/h. The supplied wet wood has a total energy content of 13.4 MWh/h. In the reactor 40 the wood is dried using usable heat from an energy recovery plant described later. From the reactor 40, 2.4 tons/h of dry wood is supplied to a pyrolysis reactor 41 for the production of charcoal. The total energy of the dried wood is 13.5 MWh/h.

In the pyrolysis reactor 41 the dry wood is converted to charcoal and pyrolysis gas. 0.6 tons/h of charcoal having a total energy content of 5.0 MWh/h is produced in the pyrolysis reactor 41 together with 1.8 tons/h of pyrolysis gas. The charcoal is supplied to the open silicon reactor 42. In addition, 0.6 tons/h of coal is supplied to this reactor. The total energy content of the coal is 5.0 MWh/h. Also quartz and 10.0 MWh/h electrical energy is supplied to the silicon reactor 42. In the furnace there will be a consumption of 87 kg/h of the carbon electrodes that will provide an additional 0.8 MWh/h to the process.

In the silicon reactor 42 the quartz is reduced to silicon by the charcoal and the coal. The silicon yield in the reactor 42 is 86%, meaning that 86% of silicon in the quartz is converted to silicon. From the reactor 0.9 tons/h of liquid silicon having a total energy content of 8.8 MWh/h is tapped, together with an off-gas consisting of gaseous components including $CO_2$-gas and silica particles. As the silicon reactor 42 is open, off gases from the silicon reactor 42 will be combusted by ambient air and CO content in the off gas will be combusted to $CO_2$. The off-gas from the silicon reactor 42 is about 81.1 tons/h and has a total energy content of 11.3 MWh/h.

The off-gas from the silicon reactor 42 is supplied to a first gas processing reactor 43 where solid particles consisting mainly of silica particles are removed from the off-gas. The gas leaving the first gas processing reactor 43 is 81.1 tons/h and has a total energy content of 11.2 MWh/h. This gas is supplied to an energy recovery plant 45 which will be described later.

The pyrolysis gas leaving the pyrolysis reactor 41 is forwarded to a second gas processing reactor 44 where the pyrolysis gas is separated into bio-oil and synthesis gas. The output from the second gas processing reactor 44 is 1.0 tons/h of synthesis gas having a total energy content of 3.5 MWh/h and 0.8 tons/h of bio-oil having a total energy content of 3.9 MWh/h.

The gas from the first gas processing reactor 43 and the synthesis gas and bio-oil from the second gas processing reactor 44, are forwarded to gas combustion chambers in the energy recovering plant 45, where the gases are combusted and supplied to a heat exchanger for the production of steam. The steam is supplied to a steam turbine and an electric generator for producing electric energy. In the energy recovery plant 45, 5.4 MWh/h of electricity and 3.7 MWh/h of usable heat are produced. Part of the usable heat may be used in the wood treatment reactor 40 and in the pyrolysis reactor 41. Silica particles is filtered and separated from the off-gas stream from the heat exchanger.

This example shows that by using 50% charcoal and 50% coal in an open silicon reactor 54% of the electric energy supplied to the silicon reactor is recovered. The overall process is thus still very energy efficient. Some emission of $CO_2$ will take place due to the coal used in the process.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:
1. Method for the energy efficient production of metals and alloys by carbothermic reduction of minerals and ores in electric reduction reactors said method comprising at least the following steps:
conveying a wood containing material to a pyrolysis reactor to at least one pyrolysis step for producing charcoal and off-gas;
conveying said produced charcoal, possibly other carbon-containing reduction materials, and metal containing raw materials to at least one electric reduction reactor for producing metal or alloy and off-gas;

conveying said produced off-gas from said at least one pyrolysis step to a second gas processing reactor and conveying said produced off-gas from said at least one electric reduction reactor for producing metal or alloy to a first gas processing reactor to process the respective off-gasses;

conveying the respectively processed off-gasses from the previous step to a common energy recovery plant to conduct at least one energy recovery step, wherein the energy recovery plant comprises at least a combustion chamber, a heat exchanger, a steam turbine and an electric generator, wherein electric energy produced in the energy recovery step is used to supply at least a part of the electric energy for the electric reduction reactor, wherein the pyrolysis reactor is in direct connection with the at least one electric reduction reactor for producing metal or alloy, wherein solid particles are extracted from said off-gas from said at least one electric reduction reactor conveyed to the first gas processing reactor for the off-gas processing step, and wherein said metal and alloy comprises at least silicon or ferrosilicon.

2. Method according to claim 1, wherein the energy recovery step comprises a combined cycle gas turbine power generation system.

3. Method according to claim 1, wherein said off-gas from said at least one pyrolysis step prior to the energy recovery step is transferred to the second gas processing reactor for a gas and oil processing step for producing bio-oil and synthesis gas.

4. Method according to claim 3, wherein produced synthesis gas from said gas and oil processing step is transferred to said at least one energy recovery step.

5. Method according to claim 3, wherein said bio-oil from said gas and oil processing step is transferred to a refining step.

6. Method according to claim 3, wherein said bio-oil from said gas and oil processing step is transferred to the energy recovery step.

7. Method according to claim 1, wherein said off-gas from said at least one pyrolysis step is transferred to a gas and oil processing step for producing synthesis gas and/or bio-oil and said off-gas from said at least one electric reduction reactor is transferred to an off-gas processing step in which solid particles are extracted from the off-gas.

8. Method according to claim 1, wherein part of the produced energy in the energy recovery step is used as a heating source for the wood pyrolysis step.

9. Method according to claim 1, wherein the reactor is an open reactor.

10. Method according to claim 1, wherein the reactor is a closed reactor.

11. Method for the energy efficient production of metals and alloys by carbothermic reduction of minerals and ores in electric reduction reactors said method comprising at least the following steps:

conveying a wood containing material to a pyrolysis reactor to at least one pyrolysis step for producing charcoal and off-gas;

conveying said produced charcoal, possibly other carbon-containing reduction materials, and metal containing raw materials to at least one electric reduction reactor for producing metal or alloy and off-gas;

conveying said produced off-gas from said at least one pyrolysis step and conveying said produced off-gas from said at least one electric reduction reactor for producing metal or alloy to common energy recovery plant to conduct at least one energy recovery step, wherein the energy recovery plant comprises at least a combustion chamber, a heat exchanger, a steam turbine and an electric generator, wherein the electric energy produced in the energy recovery step is used to supply at least a part of the electric energy for the electric reduction reactor, wherein the pyrolysis reactor is in direct connection with the at least one electric reduction reactor for producing metal or alloy, wherein said produced off-gas from said at least one electric reduction reactor, prior to the energy recovery step, is transferred to a gas processing reactor for a gas processing step in which solid particles are extracted from the off-gas, and wherein said metal and alloy comprises at least silicon or ferrosilicon.

12. Method according to claim 11, wherein said produced off-gas from said at least one pyrolysis step, prior to the energy recovery step, is transferred to a gas and processing reactor for a gas and oil processing step for producing synthesis gas and/or bio-oil, and wherein said produced off-gas from said at least one electric reduction reactor, prior to the energy recovery step, is transferred to a gas processing reactor for an off-gas processing step in which solid particles are extracted from the off-gas.

13. Method according to claim 11, wherein part of the produced electric energy in the energy recovery step is used as a heating source for the wood pyrolysis step.

14. Method according to claim 11, wherein the reactor is an open reactor.

15. Method according to claim 11, wherein the reactor is a closed reactor.

* * * * *